April 28, 1959
R. H. STAMM ET AL
2,884,078
ROTOR BLADE STRUCTURE HAVING SPANWISE
REINFORCING MEMBERS
Filed Oct. 21, 1953
2 Sheets-Sheet 1
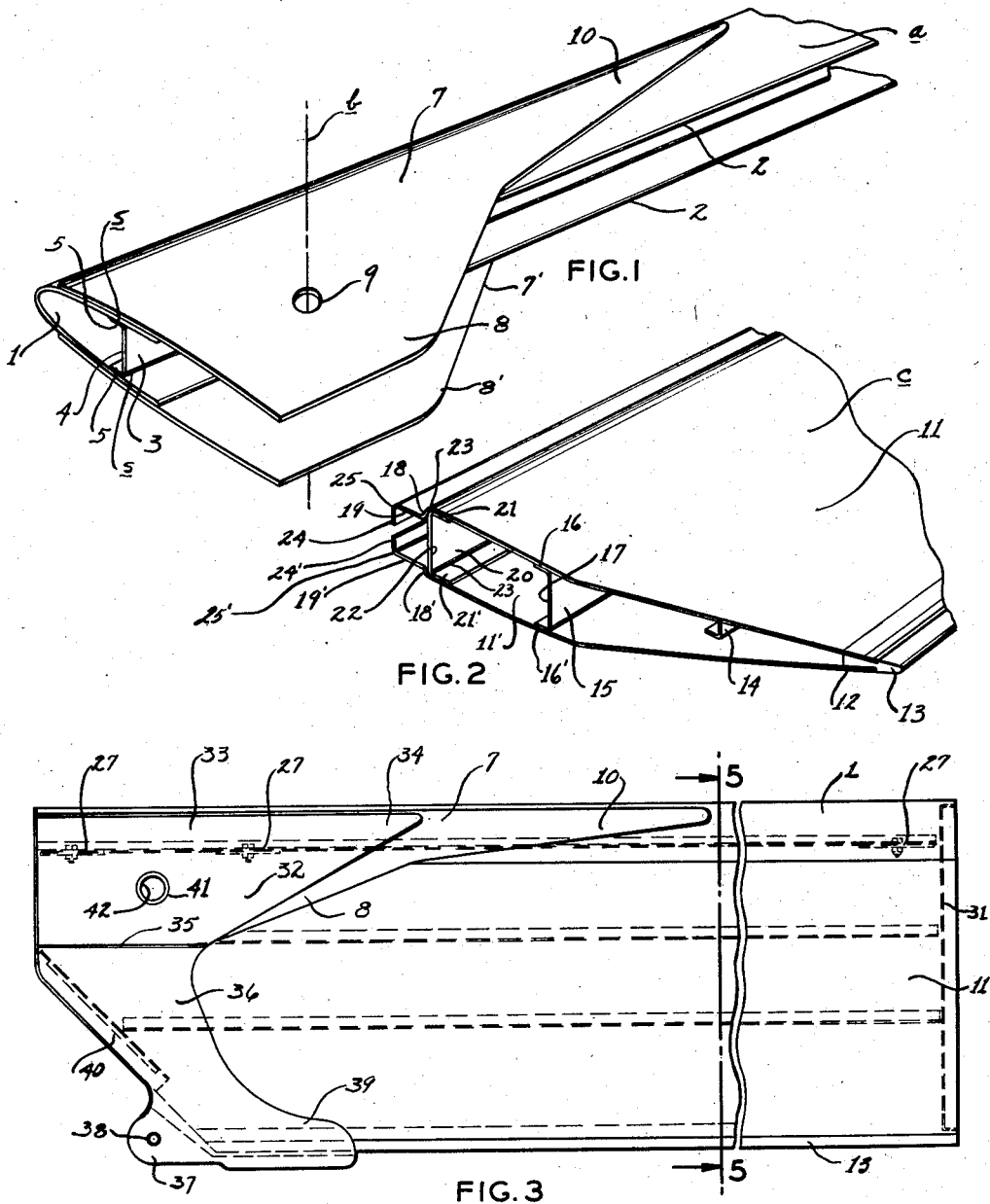
INVENTORS
ROBERT H. STAMM, HARRY D. FOX & STANLEY STEED
BY
ATTORNEY April 28, 1959

R. H. STAMM ET AL 2,884,078

ROTOR BLADE STRUCTURE HAVING SPANWISE REINFORCING MEMBERS

Filed Oct. 21, 1953

*INVENTORS*
ROBERT H. STAMM, HARRY D. FOX & STANLEY STEED
BY

ATTORNEY

United States Patent Office 2,884,078
Patented Apr. 28, 1959

2,884,078
ROTOR BLADE STRUCTURE HAVING SPANWISE REINFORCING MEMBERS

Robert H. Stamm, Traverse City, Harry D. Fox, Williamsburg, and Stanley Steed, Traverse City, Mich., assignors to Parsons Corporation, Detroit, Mich., a corporation of Michigan Application October 21, 1953, Serial No. 387,452

6 Claims. (Cl. 170—159)

The present invention relates to all-metal sustaining blades for rotary wing aircraft, and in particular to the type of construction utilizing adhesive bonding of the aft structure.

The objects of the present invention include the following:

To provide a sustaining blade for rotary wing aircraft with a lightweight metal secondary structure securely bonded to a heavy leading edge structure in such manner as will avoid the inception and progression of bonding failure;

To assure maintenance of the shape of a lightweight metal secondary structure and prevent deflections such as cause bond failure under reversals of load;

To provide a sturdy reliable primary structure constructed and joined to a lightweight secondary structure in such manner as to obtain high structural efficiency and to insure against blade failure;

To provide a simple reliable root attachment fitting adapted to coordinate structural functions of the leading edge and the aft structure without diminishing their strength; and To provide methods of assembling such rotor blades which minimize the likelihood of structural defects and aid in the discovery of such defects in early stages of assembly.

Other objects of the present invention will be apparent to those familiar with the subject matter from the description and claims which follow.

In the accompanying drawings:

Figure 1 is a perspective view of a brazed steel leading edge subassembly embodying the present invention;

Figure 2 is a perspective view of a bonded aluminum aft structural subassembly embodying the present invention;

Figure 3 is a plan view of an assembled rotor blade including the structures of Figure 1 and Figure 2, certain internal details thereof being shown by phantom lines;

Figure 4:
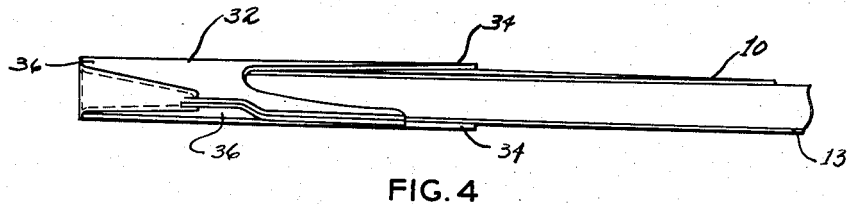
Figure 4 is a rear view of a root end fragment of the blade shown in Figure 3.

In constructing a rotor blade according to the present invention, two separate subassemblies may be first constructed. One is a steel primary structure, generally designated $a$, and illustrated in Figure 1. Its principal structural member is a heavy steel leading edge trough 1 having upper and lower spanwise aft edges 2 presented rearwardly and rounded outward and aft. The leading edge trough 1 extends without interruption from the root to the tip of the primary structure $a$, and is preferably formed by rolling heavy strip steel to such length as may be desired for the span of the rotor blade.

Inserted within the leading edge trough 1 is a steel spanwise reinforcing channel 3 having a vertical web 4 and flanges 5 presented forwardly and brazed to the inner surface of the trough 1 spacedly forward of its spanwise rear edges 2 by upper and lower brazed seams $s$ extending the entire length of the primary structure $a$. This spanwise reinforcing channel 3 is likewise preferably formed by rolling strip steel so that its length may correspond to the full span of the rotor blade and not be limited, as for example, by the capacity of a bending brake.

Adjacent the root of the leading edge trough 1, along the upper and lower surfaces thereof, are steel upper and lower root reinforcing fitting plates 7, 7', which are securely brazed to the portions of the outer surface of the leading edge trough 1 which they overlay, as shown in Figures 1 and 3. The root reinforcing fitting blades 7, 7' include upper and lower plate-like root fitting projections 8, 8' which extend aft of the leading edge trough 1 and are penetrated by upper and lower bores 9 having a vertical axis, referred to as the alignment axis $b$. These root fitting projections 8, 8' lie at substantially the region of maximum blade thickness, and are therefore nearly parallel to each other, a feature which facilitates the insertion within them of the root end of the aft blade structure subassembly $c$ hereafter described. The root reinforcing fitting plates 7, 7' extend outboard along the leading edge trough 1 to tapering outboard ends 10. Thus, structure is provided for the gradual transference of load from the leading edge trough 1 to be reacted by the bores 9 in the root fitting projections 8, 8', with no structural interruption or weakening of the leading edge trough 1 or its reinforcing channel 3.

Figure 6:
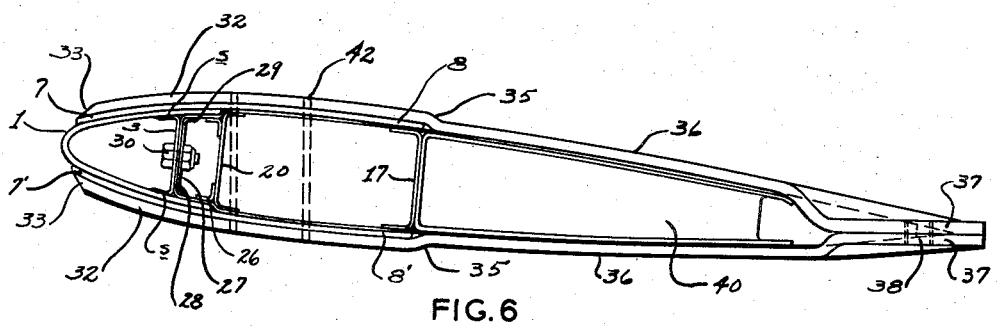
Figure 6 is a root end view of the assembled structure shown in Figure 3.

Figure 2 shows the aft blade structure subassembly, generally designated $c$, which is without any intermediate chordwise ribs. It consists of the upper and lower aft skins 11, 11' adhesively joined at their trailing edge juncture 12 by a trailing edge arrowhead extrusion 13. Forward of the trailing edge juncture 12, the aft skins 11, 11' are continuously joined along their entire spans by an aft spanwise channel 14, and spacedly forward of it an intermediate spanwise channel 15 having forward-facing upper and lower flanges 16, 16' and a substantially vertical spacer web 17. The chordwise spacing of the intermediate spanwise channel 15 is such that the position of its spacer web 17 will correspond on assembly with the rearmost portions of the root fitting projections 8, 8' of the steel primary structure $a$, as shown in Figures 3 and 6.

Figure 5:
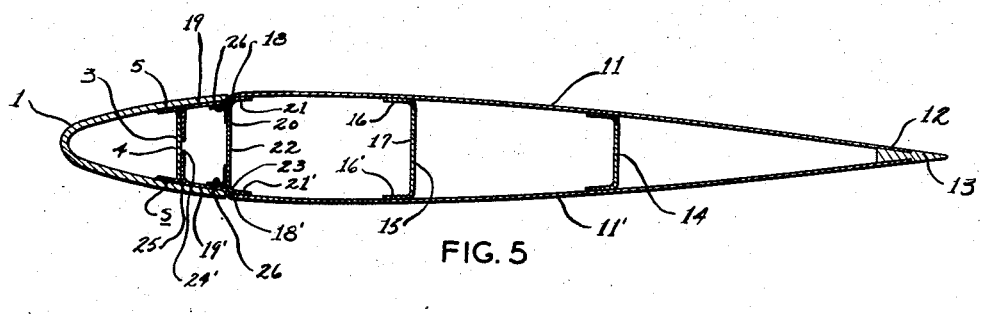
Figure 5 is a sectional view taken along line 5—5 of Figure 3.

Referring again to Figure 2 and to Figure 5, the upper and lower aft skins 11, 11' have inward joggles 18, 18' extending spanwise and adapted to offset the forward margins 19, 19' of the skins 11, 11' inward an amount equal to the thickness of the leading edge trough 1. On the aft side of the joggles 18, 18' there is adhesively bonded within and between the upper and lower aft skins 11, 11' a spanwise channel spreader reinforcement 20 having aft-facing flanges 21, 21' and a substantially vertical spreader web 22, joining at corner radii 23 which nest against the aft sides of the joggles 18, 18'. The channel spreader reinforcement 20 serves several functions, one of which is to maintain the shape of the aft structure $c$ at its spanwise junctures along and aft of the spanwise rear edges 2 of the leading edge trough 1.

The upper and lower aft skins 11, 11' terminate forwardly in the free forward edges 24, 24' which are spaced from each other. Between them and the joggles 18, 18', the forward margins 19, 19' have inward bends 25, 25', so formed that portions of the forward margins 19, 19' between the joggles 18, 18' and the bends 25, 25' may be presented against the inner surface of the leading edge trough 1 aft of its vertical web 4, and the portions of said forward margins 19, 19' between the inward bends 25, 25' and the free forward edges 24, 24' may be presented against the aft face of the said vertical web 4.

The entire aft blade structure subassembly c may be of lightweight construction because air loads aft of the leading edge trough 1 will be of relatively small magnitude and distributed without concentration. The entire aft structure is therefore fabricated of light material such as aluminum; and because concentrated loads are not encountered (save to the extent of the reactions at the root fitting hereinafter described), the weight of the aft blade structure c may be kept at a minimum.

Having independently fabricated the aft blade structure c and the steel primary structure a, the next step is to bond them adhesively to each other. Suitable adhesive bonding material such as tape cement may be applied over the entire outer surfaces of the forward margins 19, 19' from the joggles 18, 18' to the forward edges 24, 24'. Similarly, adhesive bonding material is applied over that portion of the upper and lower aft skins 11, 11' at their root end which will be overlaid by the root fitting projections 8, 8'.

The aft structural assembly c is then positioned with reference to the steel primary structure a so that the entire forward margins 19, 19' lie within the leading edge trough 1, with the forward sides of the joggles 18, 18' pressed against the spanwise rear edges 2 of the trough 1, and root fitting projections 8, 8' overlaying the root portion of the aft skins 11, 11' back to the vertical spacer web 17. At this stage, elongated spanwise assembly angles 26, coated along their entire outer angle surfaces with adhesive bonding material, may be inserted and pressed in place against the forward face of the spreader web 22 and outwardly against the inner surfaces of the forward margins 19, 19' immediately forward of the joggles 18, 18'.

By the use of simple pressure-applying cauls (not shown) the outer surfaces of the forward margins 19, 19' are pressed and flexed tightly against surfaces in contact therewith, namely the inner upper and lower surfaces of the trough 1 and the aft surface of its web 4 of its reinforcing channel 3. The free forward edges 24, 24' permit these margins 19, 19' to be pressed outward from each other to provide tight bonding contact, and the assembly angles 26 aid in this flexing process, assuring an accurate positioning and tight fit after the adhesive bond material has cured. The curing of the adhesive material is carried out in a manner suitable for the particular material employed.

The bond of the portion of the aft structure subassembly c within the root fitting projections 8, 8' is pressed into tight fit by flexing the upper and lower aft skins 11, 11' as necessary in pressing them tightly against the inner surfaces of the root fitting projections 8, 8'.

In order to provide a mechanical connection as a safety measure against the initiation of peeling, clamp connectors 27 may be utilized adjacent both the root and the tip ends. The clamp connectors 27 shown each comprise a safety plate 28 having slightly bent upper and lower edges 29 to fit securely within the inward bends 25, 25' of the forward margins 19, 19', aft of the portions which are bonded to the vertical web 4 of the channel 3 of the leading edge trough 1. These parts are bonded and clamped together by means of simple bolt connections 30 penetrating the safety plate 28 and web 4 along their center line between the free forward edges 24, 24' of the aft skins 11, 11'. In the embodiment shown, as in Figure 3, two such clamp connectors are shown adjacent the root end while only one is utilized at the tip end. The bolt connections 30 are reached through the open ends of the structure fore and aft of the web 4.

One function of such clamp connectors 27 is to serve as a safety to insure against shifting of the aft structure subassembly c under centrifugal loads. Another function is as a safety against failure of the bond of the aft structure subassembly c to the primary structure a. We have observed that bond failures are due to several causes. One is the failure to obtain suitable fit of the members to be bonded and adequate bonding pressures; and we have overcome these causes of failure by making the portion of the aft structure forward of the spreader web 22 flexible prior to assembly and by using the assembly angles 26 which assure tight bonds. Other causes of bonding failures include the application of concentrated loads to the bond and the deflection of one of the portions bonded under loads applied to the structure. The construction shown in the present invention is designated so that there will be no concentrated loading points along the bond intermediate the root and tip ends of the blade. A small concentrated load will of course be introduced by using a tip closure rib such as rib 31, shown in Figure 3; the provision of a clamp connector 27 adjacent this rib 31 serves mechanically to relieve this small bit of load concentration. The clamp connectors 27 adjacent the root end likewise serve to relieve in part the fairly small degree of load concentration necessarily present there. However, over substantially the entire span of the blade, there are no concentrated loadings introduced at any point along the bonded connection. The loadings through the forward margins 19, 19' of the aft skins 11, 11' are so small and so well distributed as not to cause trouble in this regard.

Such loadings are kept small by the construction described, which renders the aft structure quite rigid aft of the spanwise rear edges 2 of the leading edge trough 1. This rigidity functions in two ways: It avoids local deflections of the aft skins 11, 11', so that there is no tendency to peel them from the primary structure a, and it serves to transmit the loads on the aft structure c in a spanwise direction. This is achieved in part by the structural interplay between the flanges 21, 21' and corner radii 23 of the spanwise spreader channel reinforcement 20, joggles 18, 18' and the effective widths of the aft skins 11, 11' associated therewith as forming built-up beam caps of high rigidity. Another element contributing to the structural rigidity in a spanwise direction is the intermediate spanwise channel 15 with its forward facing upper and lower flanges 16, 16' and its vertical web 17, which, with the spanwise spreader channel reinforcement 20 and the skins between them, serve as a built-up box beam capable of resisting torsion as well as spanwise bending and centrifugal loadings. Because of the variety of structural loadings and changes in loading on a rotor blade, no attempt will be made here to describe the paths which loads follow under all of the loading conditions. It is sufficient to note that a substantial part of the loads on the aft structure are carried by the box beam to the blade root; and the portions which are reacted by the primary structure a are distributed to it gradually because of the torsional rigidity of such box beam; and both load concentrations and structural deflections are effectively minimized.

The ratio between the density and the modulus of elasticity of the steel primary structure a is fairly close to the ratio of the density and modulus of elasticity of the aluminum aft structure c herein described. Accordingly, the centrifugal forces on the blade masses result in substantially equal extension, and hence there will be little centrifugal shearing stress in the region of their spanwise bonds.

So far the root attachment has not been described in detail. In a number of types of helicopters now in use, rotor blades must be aligned about a nearly vertical axis such as the alignment axis b. Other types are adapted for lagging movement about a similar axis. The alignment may be controlled by using a fitting comprised of the upper and lower drag fitting plates 32 which may be adhesively bonded over the root end of the otherwise assembled structure, as shown in Figures 3, 4 and 6. Such drag fitting plates 32 are preferably formed of thick aircraft aluminum to give them necessary rigidity without excessive weight. Each consists of a forward portion 33 whose forward edge follows that of the underlaying root reinforcing fitting plates 7, 7' and tapers inboard from a drag plate tip 34 to a point overlaying the intermediate spanwise channel 15 where it is picked up by the root fitting projections 8, 8'. Each drag plate 32 has a plate joggle 35 over the aft edge of the underlaying root fitting projections 8, 8' and continues in a contoured aft extension 36 to a lobe 37. As shown in Figures 3, 4 and 6, the contoured aft extensions 36 of such drag fitting plates 32 meet and are adhesively joined to each other along the inboard end of the trailing edge juncture 12; and the lobes 37 extend inboard of such trailing edge juncture 12. The lobes 37 have a drag attachment bore 38 whose axis is parallel to the alignment axis $b$, suitable for the attachment of an adjustable alignment and drag connector (not shown).

The drag moment is reacted as a couple whose moment arm equals the distance between the drag attachment bore 38 and the alignment axis $b$. To transmit force from the drag attachment bore 38 to the trailing edge juncture 12, the drag fitting plates 32 are provided at the trailing edge with outboard toe-like extensions 39. Thus, the adhesive bonded connection acts to distribute such loads to the trailing edge juncture 12 and they are transmitted therefrom in shear to the balance of the structure. The inboard end of the aft spanwise channel 14 is held rigid by the overlaying aft extensions 36 of the drag fitting plates 32. An aft root rib 40 closes the portion of the aft structure behind the intermediate spanwise channel 15.

The upper and lower drag fitting plates 32 have bores 41 in registration with the bores 9 of the underlaying root reinforcing projections 8, 8' of the steel primary structure $a$, and the box beam portion of the aft structure is alignedly bored and a blade bushing 42 inserted. It will be noted that the major portion of the forces reacted by the blade bushing 42 will be distributed yoke-like to the root fitting projections 8, 8' of the steel primary structure $a$; but the bushing 42 will also distribute an appropriate part of the loading to the box beam of the secondary structure $c$ through the adhesive bonds.

In the foregoing description of method of assembly, it has been considered advantageous to sub-assemble the secondary structure $c$ as shown in Figure 2. Alternate to constructing such sub-assembly as a separate unit, the upper and lower aft skins 11, 11' may be separately formed with spanwise joggles 18, 18', the forward margins 19, 19' thereof having inward bends 25, 25'. Each of these may then be bonded with the forward margins 19, 19' and joggles 18, 18' in position within and against the trough 1 as shown in Figure 5. The spreader channel 20 may then be bonded in place against and behind the joggles 18, 18'. Finally, the spanwise assembly angles 26, the intermediate spanwise channel 15, the aft spanwise channel 14, and the trailing edge juncture 12 are bonded, using caul inserts appropriate for the purpose.

Other embodiments of the structure and methods herein disclosed will be apparent to those skilled in the art. Accordingly, the scope of the present invention is to be considered as coextensive with the inventive principles hereof.

We claim:

1. A rotary wing airfoil structure comprising a spar having upper and lower spanwise edges presented rearwardly and a substantially vertical aft face spaced forwardly of said edges, an aft blade structure including upper and lower skins having inwardly joggled forward margins extending forward of spanwise lines coincident with the spanwise edges of the spar, said forward margins being bent vertically and terminating in portions presented against the vertical aft face of the spar, adhesive bonds joining said inwardly joggled forward margins, including said vertical portions, to the spar, and a spanwise spreader reinforcement between said skins adjacent and immediately aft of said joggles and maintaining said skins spaced apart so as to preserve the airfoil contour.

2. An airfoil structure as defined in claim 1, the space between the inner surfaces of the forward margins of the said upper and lower skins being substantially unimpeded from blade root to tip, wherein tools for applying bonding pressure may be inserted, in the course of manufacture and prior to affixing any root or tip attachment, the said forward margins being of lesser stiffness than the spar whereby to flex under such bonding pressure against the spar and become securely bonded thereto.

3. A smoothly-contoured, hollow, internally reinforced airfoil comprising a spanwise spar having a spar edge projecting chordwise, together with an airfoil skin having an outer surface coincident with the airfoil contour, an inward joggle adjacent the spar edge and a skin margin adjacent the joggle and joined to the inner surface of the spar edge, in combination with a spanwise spreader channel having a flange joined to the inner surface of the skin adjacent the joggle and a web-to-flange juncture nested within the joggle opposite the spar edge, whereby to resist deflection of the skin from the airfoil contour.

4. An airfoil as described in claim 3, the outer surface of the spar edge being coincident with the airfoil contour, the depth of the joggle being equal to the depth of the spar edge.

5. An airfoil as described in claim 3, the joint between the inner surface of the spar edge and the outer surface of the skin margin being adhesively bonded over a joint width extending to the joggle, peeling of said bonded joint being avoided by the resistance to deflection offered by the spreader channel.

6. An airfoil as described in claim 5, together with a spanwise reinforcement angle adhesively bonded between the web of the spreader channel and the inner surface of the skin margin, whereby to further increase resistance to deflection and joint peeling.

References Cited in the file of this patent

UNITED STATES PATENTS

| | | |
|---|---|---|
| 2,450,455 | Snyder | Oct. 5, 1948 |
| 2,460,351 | Hoffman et al. | Feb. 1, 1949 |
| 2,470,128 | Barrick | May 17, 1949 |
| 2,511,858 | Lampton | June 20, 1950 |
| 2,574,980 | Meyers | Nov. 13, 1951 |
| 2,580,363 | Schmitt | Dec. 25, 1951 |
| 2,589,193 | Mayne | Mar. 11, 1952 |
| 2,596,818 | Meyers | May 13, 1952 |
| 2,694,458 | Stevens | Nov. 16, 1954 |

FOREIGN PATENTS

| | | |
|---|---|---|
| 447,520 | Great Britain | May 20, 1936 |